Oct. 17, 1933.　　　　E. B. FERNBERG　　　　1,930,931
PRESS FOR MAKING TALKING MACHINE RECORDS
Filed Oct. 30, 1928　　　3 Sheets-Sheet 1

Inventor.
Eric Birger Fernberg.
By Cameron, Kerkam and Sutton.
Attorneys.

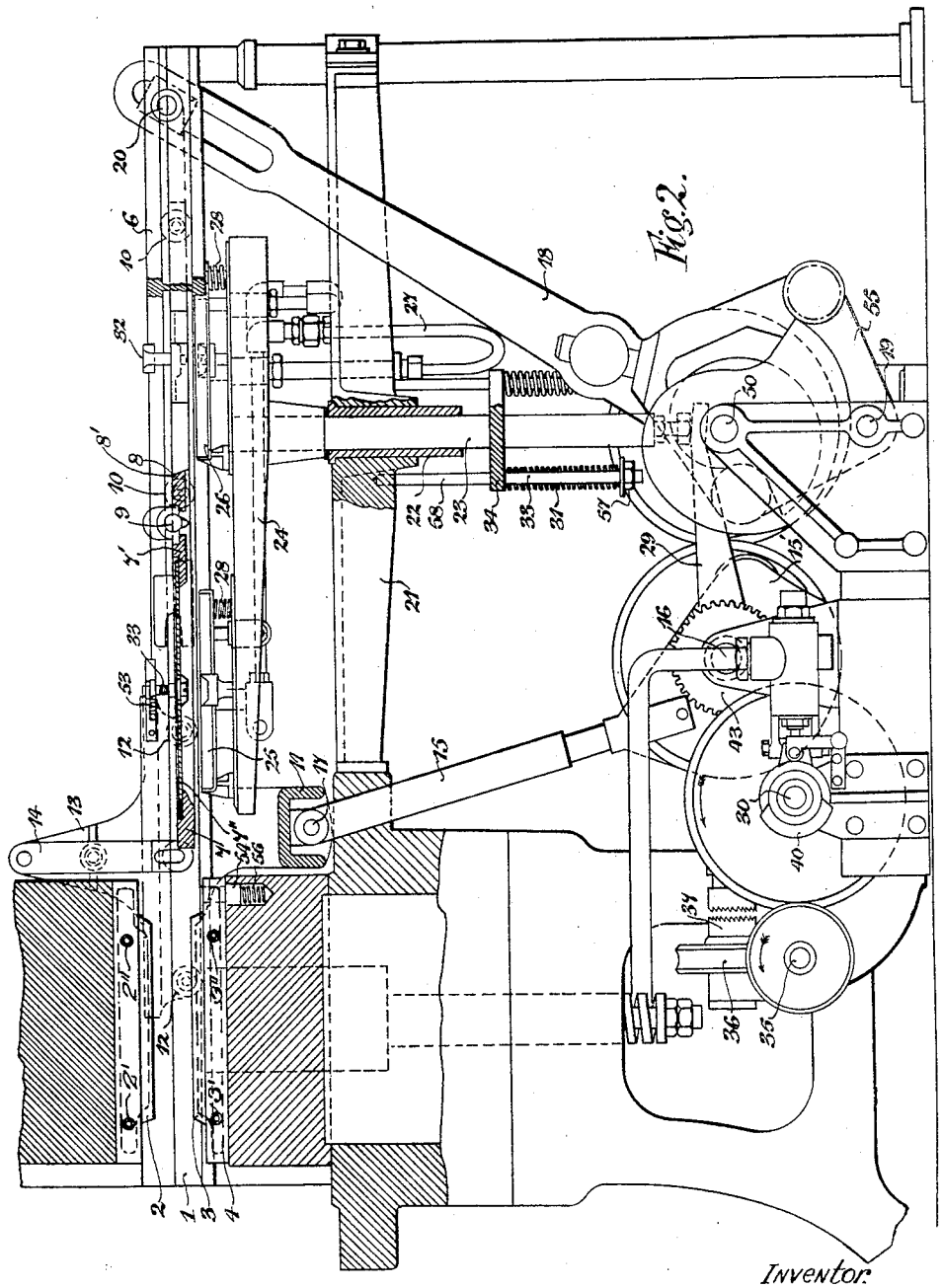

Oct. 17, 1933.  E. B. FERNBERG  1,930,931
PRESS FOR MAKING TALKING MACHINE RECORDS
Filed Oct. 30, 1928  3 Sheets-Sheet 3
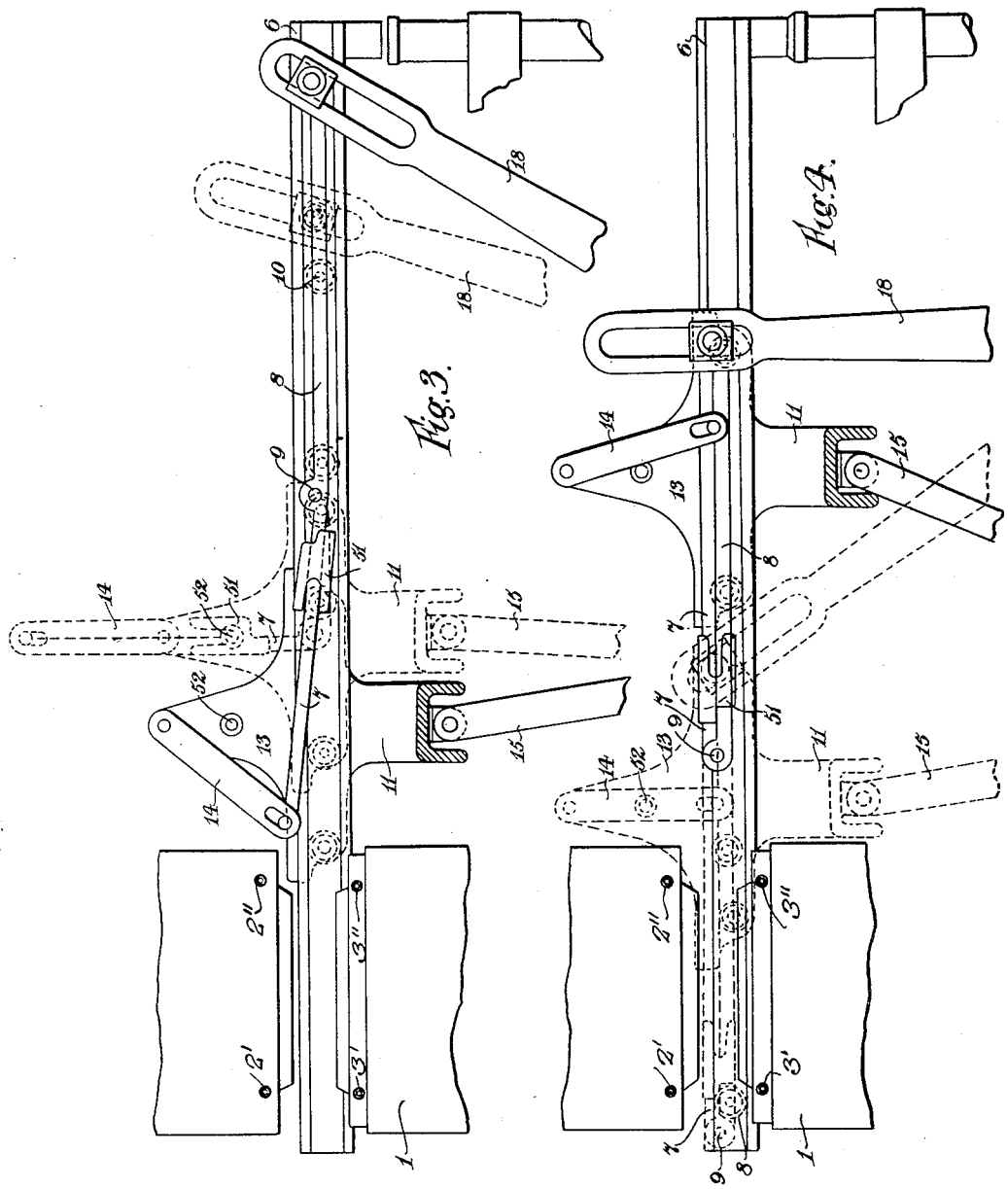
Inventor.
Eric Birger Fernberg.
By Cameron, Kerkam and Sutton.
Attorneys.

Patented Oct. 17, 1933

1,930,931

UNITED STATES PATENT OFFICE 1,930,931

PRESS FOR MAKING TALKING MACHINE RECORDS

Eric Birger Fernberg, Edgware, England, assignor, by mesne assignments, to Radio Corporation of America, New York, N. Y., a corporation of Delaware Application October 30, 1928, Serial No. 316,078, and in Great Britain November 7, 1927

13 Claims. (Cl. 18—16)

This invention relates to improvements in and relating to presses for making talking machine disc records.

In the pressing of disc records it is common practice to-day to provide the molds in which the matrices are secured, with channels through which steam is passed for heating the molds prior to the application of pressure, so that the thermo-plastic material used may be kept soft, and through which cold water is subsequently passed to cool the molds and set the material. The molds also are commonly though not always fixed in the press itself. It is found in practice that although the mold itself is cooled by the passing of water through the channels nevertheless a certain amount of heat is communicated on each pressing operation to the body of the press itself, so that after the press has been in use for some time a longer period is necessary to cool off the molds sufficiently, owing to the temperature to which the press parts surrounding the molds has been gradually raised.

This objection is to some extent overcome by arranging the molds so as to be removable from the press for the insertion of the plastic material and subsequent removal of the pressed record, the molds being connected by flexible tubing with the steam and water supplies, so that they can be heated and cooled as previously practiced. Nevertheless with this arrangement also, after the heated molds, which with their channeled portions are necessarily of considerable bulk, have been repeatedly replaced in the press for the pressing operation, the press becomes heated and the cooling operation takes longer.

The objection is particularly noticeable in automatic presses where a fixed cycle of operations is automatically performed, the heating of the molds, their insertion in the press, the application of pressure, the cooling of the molds, their release and removal from the press, for with these automatic presses the time for cooling is set by cam adjustment for example, and while such a press may operate satisfactorily for one hour, at the end of two hours it may be found that the time allowed for cooling is insufficient and records have to be removed before they are properly set.

These objections are obviated by the present invention, which provides for the heating and cooling of the molds, not by passing steam or water through channels in the molds, but by bringing them in contact alternately with continuously heated bodies outside and separate from the press and with continuously cooled bodies inside or forming part of the press. Further, according to the present invention the molds themselves are made much lighter and thinner than has been the practice where the molds have been channeled bodies for passing the heating and cooling fluids.

Further, in accordance with the present invention the upper and lower molds are hinged together by pin and slot hinges and arms are pivotally connected at one or either side of the lower mold and through links at one or either side of the upper mold, and at their lower end mounted on fixed pivots and these arms are moved by suitable cam mechanism so that, after the pressing operation, the molds folded together are withdrawn from the press, the lower mold travelling outwards horizontally, running on rollers first on rails and then in guides provided for the purpose while the upper mold when clear of the press is folded back until it lies in the same plane with the lower mold, and in this position both molds rest upon supports carried by the press. After the removal of the pressed record, heating bodies through which steam is continuously passing to keep them in a heated condition are raised from a lower position automatically to make contact with the molds and simultaneously to strike up the centre pin of one of the molds. These heating bodies are raised by a spindle actuated by a cam. After the pressed record has been removed and the molds have been charged with the record labels and a quantity of material for the next record, the action of the arms is reversed and the upper mold is again folded over the lower mold and the heating bodies having been lowered, the two molds are passed by their lever mechanism into the press, whereupon the ram of the press is operated to press the record. The ram and head of the press are kept continuously cooled by the passage of cold water through suitable channels.

The other centre pin is fixed and on pressure being applied to the molds, the movable pin is pushed backwards into its mold, so that its lower end protrudes below. The movable pin has a head which co-operates with a shoulder in the mold to ensure that the pin is not dislodged.

Not only are the molds used in the present invention much lighter than those hitherto used, but they are preferably recessed and chamfered on their undersides, so that when the molds are being heated the upper surface of the heating bodies enters a short distance into the under-side of the molds and similarly when the molds are being pressed together in the press the ram and head of the press enter the recesses in the undersides of the molds, the result being that the heating operation and cooling operation are performed more rapidly. The chamfer also serves to locate the molds during the pressing and heating operations.

The mechanism comprises one cam for operating the lever connected to the lower mold, which draws out the molds from the press, and another cam operating the lever connected to the upper mold, which turns the latter over. For turning the upper mold over the dead centre, a pin is provided on the side of a member which moves with the upper mold, which pin co-operates with a cam slot on the side of the upper mold.

Means are provided to prevent the cool press from cooling the thin folded mold plates in the interval between the entry of the molds into the press and the moment when pressing commences, these means taking the form of spring pressed pins which project upwardly from the lower press platen to support the mold plates out of contact with the cooled lower platen until the press closes when the said pins are automatically depressed.

The invention is illustrated by way of example in the accompanying drawings in which:

Fig. 2 is a sectional elevation of Fig. 1 and

Figs. 3 and 4 are diagrammatic illustrations showing the movements of opening and closing the mold plates and inserting the mold plates in and withdrawing them from the press.

Figure 1:
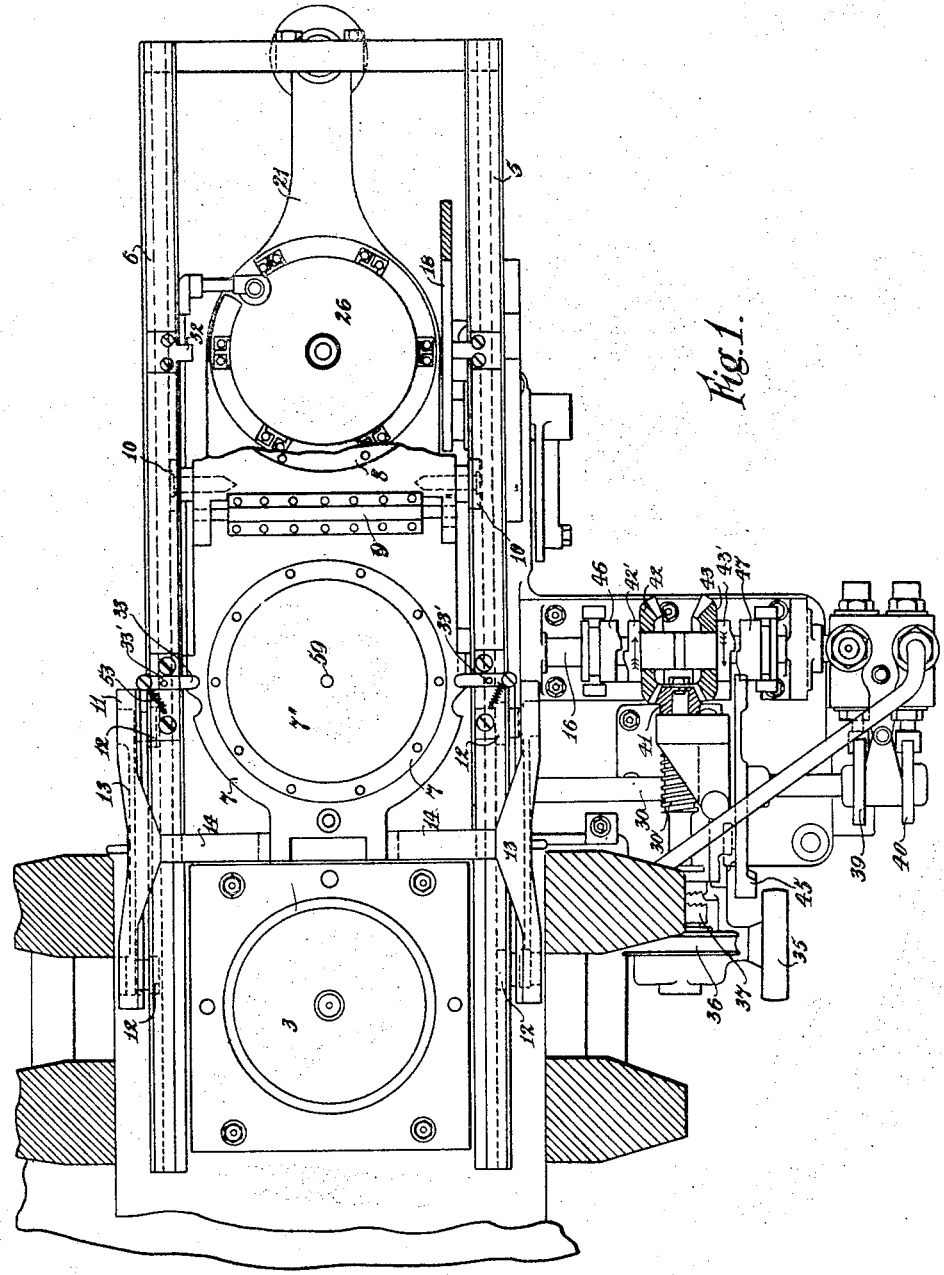
Fig. 1 is a plan view partly in section of a press according to the invention.

Referring to the drawings, 1 is a press having the usual fixed upper platen 2 and lower vertically movable platen 3 mounted on an hydraulically operated ram 4, said platens 2 and 3 being provided with suitable inlet and outlet pipes 2', 2'' and 3', 3'' for the circulation of a suitable cooling medium.

On each side of the press are arranged guide rails 5 and 6 of I section, these rails extending from the press a considerable distance horizontally. The parts of the inside upper flanges of the guide rails 5 and 6 within the press, are removed for a purpose to be described.

Mold plates 7 and 8 are hingedly connected at their adjacent ends 9 and mold plate 8 is furnished with laterally extending rollers 10 which roll in the inside channels of the guide rails 5 and 6 during the movement of the mold plates into and out of the press 1.

The mold plates comprise supporting frames 7' and 8' having circular openings in which the matrices 7'' and 8'' having light backing plates, are clamped. It will be clear that since, as stated above, no channels for the circulation of heating and cooling media need to be provided in the mold plates, these plates embody a minimum of material, and this makes for rapid heating and cooling.

Upon the guide rails 5 and 6 also moves a substantially U-shaped member 11 mounted on rollers 12 which run in the outer channels of the rails. The member 11 is provided with a pair of upstanding pillars 13, one on each side of the press, to the upper ends of which pillars 13 are pivotally connected links 14, which links in turn are pivotally connected at their other ends to the free end of the upper mold plate 7. The member 11 is adapted to be moved horizontally through a lever 15 connected with a quadrant 15' pivoted on the machine at a point not shown and adapted to be rocked by cams on a shaft 16. The lever 15 is connected by pin and slot connection at 17 to the member 11. The quadrant 15' is moved by opposing cams in two directions during one revolution of shaft 16 so that member 11 is moved in both directions during this period.

A lever 18 mounted to rock about a shaft 50 on the machine is connected by pin and slot connection at 20 to the outer end of the lower mold plate 8. This lever 18 is rocked about shaft 50 through a quadrant 55 pivoted at 19 on the machine frame to rock under the influence of cams on shaft 50. The lever 18 is rocked in one direction only during one revolution of shaft 50 which is driven by shaft 16 through 1:1 gear.

Beneath the guide rails 5 and 6 is rigidly mounted a girder 21 carrying a bearing sleeve 22 in which moves a vertical rod 23, carrying at its upper end a plate 24. The plate 24 serves as a support for the heating units 25 and 26 which may be in the form of hollow bodies containing coils (not shown) through which steam is circulated via the flexible steam supply pipes 27.

The heating units may be flexibly mounted on the plate 24 being supported at one side on spiral springs 28 carried on the plate 24 and they are shaped to enter within the frames 7' and 8' and beneath matrices 7'' and 8'' when the rod 23 and plate 24 are raised, to obtain the best possible transfer of heat from the units 25 and 26 to the mold plates. The rod 23 rests with its lower end on a rocking lever 29 mounted to rock at appropriate intervals about shaft 16 under the influence of a cam (not shown) on shaft 30, the arrangement being such that the heating units are lifted into the raised position when the mold plates are to be heated and lowered preparatory to the closing of the molds and their insertion in the press. Springs 31 are provided between nuts 57 on fixed bolts 33 and a collar 34 on rod 23, to assist in raising the rod 23 and parts carried thereby.

In order that the mold plates 7 and 8 shall not be lifted by the heating units when the latter are raised, stops 32 and 33 are provided on the guide rails 5 and 6, the stops 32 being fixed and extending over the lower mold plate 8 and the stops 33 being pivoted to the rails 5 and 6 at 33' so as to be capable of moving between positions where they extend over the mold plate 7 and where they are out of the path of the latter when it is to be raised.

The operation is as follows:

Assuming the parts to be in the positions shown in Figs. 1 and 2, the labels for the records are placed one over the centre pin 59 of the upper mold plate 7 and the other over the centre pin (not shown) of the lower mold plate 8. The former centre pin 59 is fixed while the latter is axially movable in an aperture in the mold plate, being pushed upwards when the parts are in the position shown in Fig. 1 by engagement of its lower end with the heating unit 26.

The record material is placed on the lower mold plate and the apparatus set in motion. A constantly driven shaft 35 drives through worm gearing a member 36. When the machine is to be started a clutch 37 is thrown in, by any convenient means, whereupon the drive is imparted through worm gearing 30' to a shaft 30 which carries cams 39 and 40 controlling the inlet and exhaust valves for the ram of the press, and an additional cam 45 the purpose of which will be described later, and through a bevel wheel 41 to a pair of bevel pinions 42 and 43 which rotate in opposite directions upon shaft 16. The bevel pinions 42 and 43 each carry a clutch sleeve 42' and 43' and these clutch sleeves co-operate with clutch sleeves 46 and 47 mounted for longitudinal movement with shaft 16 and with regard to pinions 42 and 43. It will readily be seen that the shaft 16 will rotate in one direction or the other according to which clutch 42', 46 or 43', 47 is in engagement and this is determined automatically during a cycle of operations by the cam 45 on shaft 30.

It will also be understood that for certain periods both clutch 42', 46 and 43', 47 are out of operation as shown in Fig. 1.

The cycle having been started, the lever 29 rocks under the influence of a cam on shaft 30 and the rod 23 and heating units 25, 26 are lowered. At this point cam 45 causes clutch 42', 46 to engage and shaft 16 is rotated in a clockwise direction, shaft 50 is rotated counter-clockwise and lever 18 commences to move slowly to the left.

Movement of lever 15 causes member 11 to move towards the right taking with it the pillars 13 and the links 14. The forward ends of member 11 engage the outer ends of the pivoted stops 33 to swing them from the position over mold plate 7 against springs 53. The links 14 being connected with the upper mold plate 7, swing about their pivots on pillars 13 in a clockwise direction and in consequence mold plate 7 is lifted about the axis 9 as shown in full lines in Fig. 3. As movement continues the parts reach the position shown in dotted lines in Fig. 3 where the links 14 and mold plate 7 are vertical and a slotted plate 51, on the side of mold plate 7 is engaged with a pin 52 on pillar 13. Further movement results in mold plate 7 being turned about the dead centre formed by pin 52 by the push imparted by lever 18 and plate 8, links 14 are lowered, pin 52 disengages from slot 51 and the parts reach the position shown in full lines in Fig. 4 where the molds are folded together outside the press.

The movement of lever 18 towards the left continues but the shape of the cam driving lever 15 is such that the direction of movement of the latter is reversed. Consequently the folded molds are now inserted in the press as shown in dotted lines in Fig. 4.

At this point the cam 45 opens the clutch driving shaft 16 and the latter becomes stationary while the cam 39 or 40 on shaft 30 opens the hydraulic pressure supply to the press ram.

When the ram begins to rise the mold plates are lifted towards the upper fixed platen, this movement being permitted owing to the removal of the inner upper flanges of rails 5, 6 within the press as above stated. During the earlier part of the closing movement of the press the mold plates are supported upon studs 54 mounted in apertures in the lower press platen and normally urged upwardly by springs 56 so that the lower mold plate is held out of contact with the press platen and premature cooling of the mold plates is avoided.

When the lower platen lifts to a given height the upper mold plate contacts with the upper platen the studs 54 are depressed, and pressing begins.

During this time the shaft 30 is rotating but shafts 16 and 50 are stationary.

After a given interval of time the hydraulic inlet valve is closed and the exhaust valve opened and cam 45 throws in clutch 43', 47 so that shafts 16 and 50 are rotated in the reverse directions to those previously described and the levers 15 and 18 are rocked to remove the mold plates from the press and to open them in a manner which will be obvious from the above description. When the open position is reached, cam 45 opens clutch 43' 47, so that levers 15 and 18 become stationary and lever 29 is rocked to raise the heating units into contact with the lower surfaces of the mold plates to heat the latter.

After a given and predetermined interval during which the mold plates are heated and the labels and record material are applied, the cycle of operations above described recommences.

I claim:

1. An automatic record press comprising a mold movable in a straight path into and out of the press, means for moving said mold, means for opening said mold on movement out of said press and for closing said mold on movement into said press, heating means external to said press and vertically reciprocable in said path to heat said mold after it has been moved out of said press and opened, and means for cooling said press.

2. An automatic record press comprising a mold movable in a straight path into and out of the press and comprising a plurality of relatively movable parts, means for moving said mold, means for opening said mold parts on movement out of said press and for closing said mold parts on movement into said press, and heating means external to said press and vertically reciprocable in said path to heat each of said mold parts after they have been moved out of said press and opened.

3. An automatic record press comprising a mold movable in a straight path into and out of said press, means for reciprocating said mold, means for opening said mold on movement out of said press and for closing said mold on movement into said press, heating means external to said press and vertically reciprocable in the path of movement of said mold to heat the same, and means for cooling said press.

4. An automatic record press comprising a mold movable in a straight path into and out of said press and comprising a plurality of relatively movable parts, means for reciprocating said mold, means for opening said mold parts on movement out of said press and for closing said mold parts on movement into said press, and heating means external to said press and vertically reciprocable in the path of the movement of said mold to heat said mold parts after they have been opened.

5. An automatic record press comprising a movable mold, means for moving said mold in a straight path into and out of said press, means for opening said mold on movement out of the press and closing said mold on movement into the press, a heated body external to said press, and means for moving said heated body into contact with said mold after it has been moved out of said press and opened.

6. An automatic record press comprising a movable mold, means for moving said mold in a straight path into and out of the press, said mold comprising a pair of mold plates hinged together, means for reciprocating said mold, means for opening said mold plates on movement of said mold out of the press and for closing said mold plates on movement of said mold into the press, a pair of heated bodies external to said press, means for moving said bodies into contact with each of said mold plates after said mold has been moved out of the press and opened, and means for cooling said press.

7. An automatic record press comprising a movable mold, means for moving said mold in a straight path into and out of the press, said mold comprising a plurality of parts adapted to be folded together for the pressing operation, the outer surfaces of said mold parts being recessed, means for moving said mold, means for opening said mold parts on movement of said mold out of the press and for closing said mold parts on movement of said mold into the press, a plurality of heated bodies external to said press, and means for moving said bodies into said recesses in contact with said mold parts when in open position.

8. An automatic record press comprising a mold movable in a straight path into and out of the press and comprising a pair of hinged mold parts adapted to be folded together for the pressing operation, means for moving said mold, means for opening said mold parts into substantially the same horizontal plane on movement of said mold out of said press and for closing said mold parts on movement of said mold into the press, and heating means external to said press and vertically reciprocal in the path of movement of said mold to heat both of said mold parts when in open position.

9. An automatic record press comprising a mold movable in a straight path into and out of said press and comprising a pair of mold plates hinged together at one end, means for moving said mold including a pair of operating members each operatively connected to the free end of one of said mold plates, and a common means for actuating said operating members in timed relation to open said mold plates as the mold is moved out of the press and to close said mold plates as the mold is moved into the press, and means for temporarily supporting said mold in said press out of contact therewith prior to the closing thereof.

10. An automatic record press comprising a mold movable in a straight path into and out of the press and comprising mold plates hinged together at one end, a pair of rocking arms, means operatively connecting each of said arms with the free end of one of said plates, means for rocking said arms in timed relation to open said plates while moving said mold out of the press and to close said plates while moving said mold into the press, and means for temporarily supporting said mold in said press out of contact therewith prior to the closing thereof.

11. An automatic record press comprising a horizontal track, a mold movable on said track into and out of the press and comprising upper and lower mold plates hinged together, a rocking arm operatively connected to said lower mold plate to move said mold into and out of the press, a second rocking arm operatively connected to said upper mold plate and actuated in timed relation with said first rocking arm to open said plates when the mold is moved out of the press and to close said plates when the mold is moved into the press, and means for temporarily supporting said mold in said press out of contact therewith prior to the closing thereof.

12. An automatic record press comprising a mold movable in a straight path into and out of the press and comprising a pair of hinged parts, means connected to one of said parts to move said mold into and out of the press, a movable member, a link pivotally connecting said member and the other of said mold parts, means for moving said member in timed relation with said first named means to open said mold parts on movement thereof out of the press and to close said mold parts on movement thereof into the press, and means for temporarily supporting said mold in said press out of contact therewith prior to the closing thereof.

13. An automatic record press comprising a mold movable in a straight path into and out of the press and comprising a pair of hinged parts, means connected to one of said parts to move said mold into and out of the press, a movable upright, a link pivotally connecting said upright and the other of said mold parts, means for moving said upright in timed relation with said first named means to open and close said mold parts as the mold is moved out of and into the press respectively, inter-engaging means on said upright and said second named mold parts to turn the latter past dead center position, and compressible means for supporting said mold in said press out of contact therewith prior to the closing thereof.

ERIC BIRGER FERNBERG.